United States Patent

[11] 3,545,463

[72] Inventor John L. Mueller
 Detroit, Michigan
[21] Appl. No. 737,119
[22] Filed June 14, 1968
[45] Patented Dec. 8, 1970
[73] Assignee Sparton Corporation
 a corporation of Ohio

[54] TIRE MOUNTING HEAD
 14 Claims, 14 Drawing Figs.
[52] U.S. Cl. ................................................ 157/1.24
[51] Int. Cl. ..................................................... B60c 25/08
[50] Field of Search ........................................... 157/1.1,
 1.17, 1.2, 1.22, 1.24

[56] References Cited
 UNITED STATES PATENTS
2,661,053 12/1953 Mullen .......................... 157/1.1

| | | | |
|---|---|---|---|
| 2,816,604 | 12/1957 | Greenley et al.............. | 157/1.24 |
| 2,817,394 | 12/1957 | Kriebel, Jr. et al............ | 157/1.24 |
| 2,900,018 | 8/1959 | Harrison....................... | 159/1.24 |

Primary Examiner—Granville Y. Custer, Jr.
Attorney—Beaman & Beaman

ABSTRACT: The invention pertains to apparatus for mounting vehicle tires upon wheels, and the apparatus is particularly suitable for mounting tires of a relatively "stiff" nature such as those using polyester and fiberglass cords and internal components. The tire mounting head is mounted upon a fixed frame for movement toward and away from a conveyor which moves the wheels and tires past the head to produce the mounting operation. Unique holddown and compression means are utilized to accomplish the mounting.

INVENTOR
JOHN L. MUELLER
BY Beaman & Beaman
ATTORNEYS

INVENTOR
JOHN L. MUELLER
BY Beaman & Beaman
ATTORNEYS

TIRE MOUNTING HEAD

BACKGROUND OF THE INVENTION

The field of the invention lies in the art of mounting vehicle tires upon wheels wherein automatic means are used to spread the tire bead and force the tire over the wheel rim to produce the assembling operation.

A number of automatic tire mounting devices are currently being used by automobile manufacturers to automatically mount the vehicle tire upon the wheel. In the state of the known art the wheel is mounted upon a conveyor, and a tire is supported upon the wheel in a preliminarily assembled relation relationship and the wheel and tire are moved through the mounting apparatus. The mounting apparatus spreads the bead of the tire and forces the tire over the wheel rim to locate the tire between the wheel rims wherein the tire is then ready for inflation. Of course, this type of assembly procedure is primarily intended for tubeless tires, in that tube type tires require the additional step up placing and locating the tube within the tire carcass.

The prior art is best represented in the assignee+s U.S. Pat. Nos. 2,665,747 and 2,900,018. These patents disclose tire mounting devices having a number of similarities to the instant invention. However, the prior patented devices have not been suitable for the mounting of the more recent types of tires currently being placed upon the market. For instance, wide tread tires, oval tires, and tires utilizing polyester and fiberglass cords and internal components are now available. The physical characteristics of such tires prevent the tire mounting apparatus shown in the aforementioned patents from being successfully used with the newer tires, and accordingly, it is the purpose of the invention to provide a tire mounting apparatus which is a capable of mounting the aforementioned type tires.

Tires employing polyester and fiberglass cords and other components, and tires wherein the core cords are arranged in a radial direction, commonly known as "radial" tires, usually have a "stiffness" and a resistance to compression and folding considerably higher than tires of more conventional construction utilizing rayon and nylon cords. The apparatus of the invention overcomes the difficulties encountered in mounting such tires.

SUMMARY OF THE INVENTION

It is a basic purpose and object of the invention to provide an automatic tire mounting apparatus and head which is capable of mounting a wide variety of tires having various configurations and characteristics. The apparatus of the invention is capable of mounting tires having unusually "stiff" characteristics or high resistance to compression and folding. The invention is particularly suitable for mounting tires utilizing polyester and fiberglass cords. In the practice of the invention a conveyor translates a wheel having a tire preliminarily related thereto under the tire mounting head which is supported upon a frame extending over the conveyor. The head is lowered to sense the size of the wheel rim, and a pair of rim engaging shoes spread the bead over the rim whereby the tire beads may be forced down over the upper wheel rim. Simultaneous with the spreading of the tire beads, the mounting apparatus utilizes holddown means for holding the forward end of the tire down, and holding that portion of the tire that has been mounted by the shoes in the proper location with respect to the wheel rim to prevent the tire from raising or lifting the bead above the rim once that it has been disposed thereunder by the mounting shoes. Additionally, it is desirable that compression means be utilized which engage the sidewalls of the tire to compress and force down the sidewalls of the tires simultaneously with the bead spreading operation.

Pneumatic biasing means are utilized in maintaining the mounting shoes in engagement with the wheel rim. Additionally, the holddown means are pivotally mounted wherein they are capable of moving in a direction transverse to the direction of movement of the conveyor, and also move, to a limited extent, in the direction of the conveyor. In this manner the relationship of the holddown means to the tire changes during the mounting operation to provide the most effective manner of holding the tire during mounting. Biasing means of a pneumatic type, are also used to maintain a biasing force upon the holddown means, which includes a surface for engaging the wheel rim.

In the disclosed embodiment a pneumatically operate operated brake or clamp is used to hold the head in the desired mounting position. This brake means is used in conjunction with a cam operated push rod having a compressible component, and a limit switch is used with the push rod to sense compression of the push rod to permit release of the brake after the tire mounting operation has been completed, and the mounting head is in a condition to be raised.

BRIEF DESCRIPTION OF THE DRAWINGS

The aforementioned objects and purposes of the invention will be appreciated from the following specification and description and accompanying drawings wherein.

DESCRIPTION OF THE PREFERRED EMBODIMENT

Figure 1:
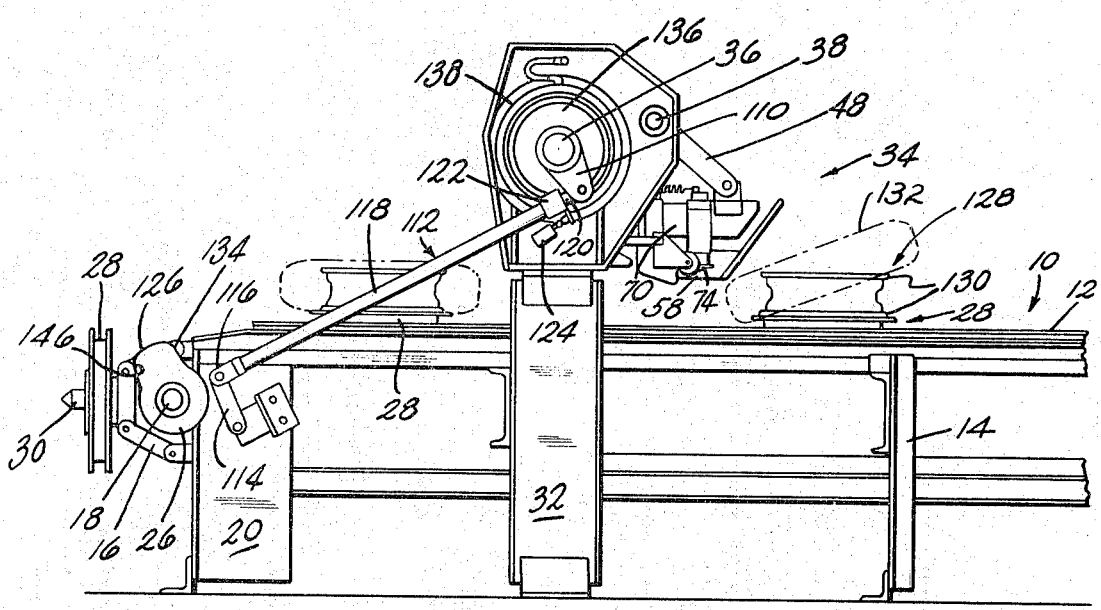
FIG. 1 is an elevational view of the conveyor and tire mounting apparatus in accord with the invention, illustrating an unmounted tire and wheel approaching them the mounting head, while a mounted tire and wheel leaves the head.
Figure 2:
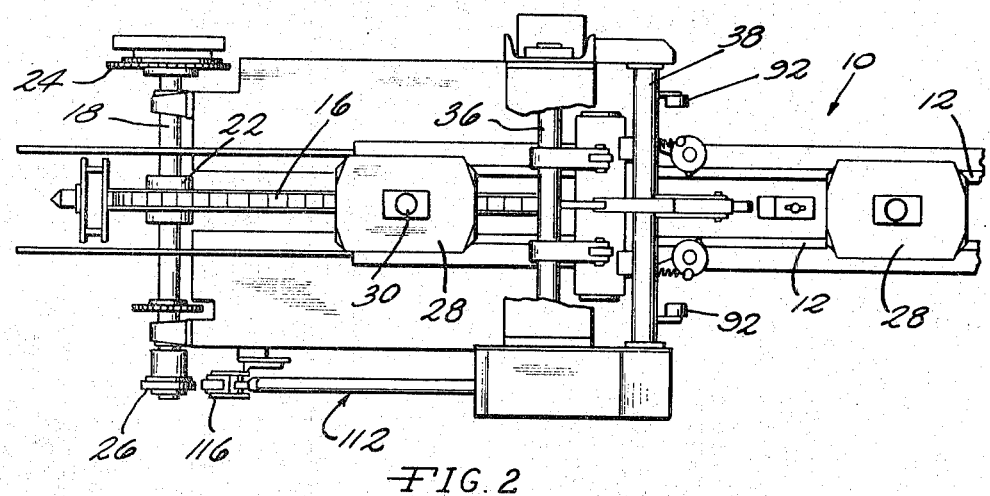
FIG. 2 is a plan view of the apparatus of FIG. 1, a portion of the frame being broken away to better illustrate the links supporting the mounting head.
Figure 3:
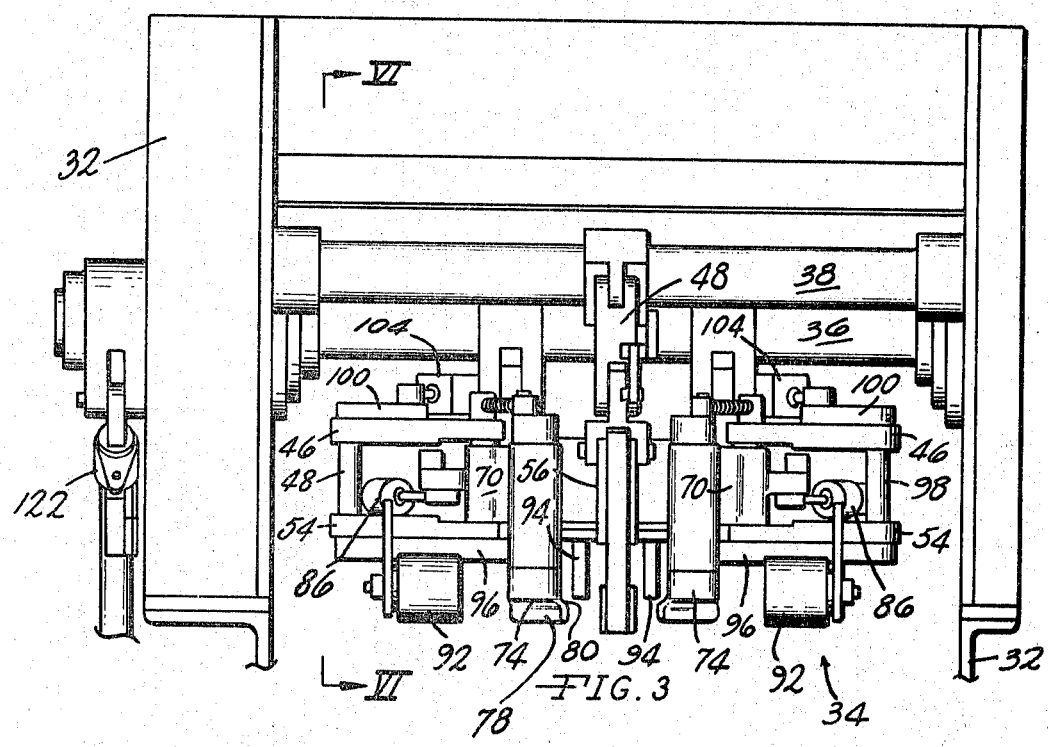
FIG. 3 is an enlarged, elevational, front view of the mounting head apparatus in accord with the invention.

The basic arrangement of the primary components used in the practice of the invention will be apparent from FIGS. 1 and 2.

An endless chain conveyor is represented at 10 and includes conveyor rails 12 mounted upon legs 14. The conveyor chain 16 passes over a shaft 18 which is rotatably supported in fixed bearing blocks on a frame 20, and includes a sprocket 22 meshing with the conveyor chain. The conveyor shaft 18 is power driven by means of an electric motor, not shown, connected to the shaft through a chain and sprocket 24, only the sprocket being illustrated. The other end of the conveyor shaft 18 has a cam 26 fixed thereto for a purpose that will be later described.

The conveyor chain 16 and rails 12 have a plurality of wheel supporting carriers 28 mounted thereon for movement parallel to the rails, and each of these carriers includes a vertically extending spindle or stud 30, and other locating means for positioning a vehicle wheel thereon.

The mounting frame includes a pair of column members 32 which support the mounting head 34. The columns 32 are disposed upon opposite sides of the conveyor 10 wherein the head 34 is located at a vertical position over the conveyor.

A shaft 36 is rotatably supported upon the columns 32 and extends therebetween as to be disposed over and bridge the conveyor. Likewise, a rod 38 is mounted across the columns in a direction toward the right, FIG. 1, with respect to shaft 36, which is the direction from which the partially assembled wheels and tires travel toward the mounting apparatus.

The tire mounting head 34 is suspended from the shaft 36 and the rod 38 on three links. Links 40 are of a similar configuration, and are fixed upon the shaft 36 for rotation therewith. The lower portion of links 40 includes pivot pins 42, which cooperate with mounting bosses 44 defined upon the upper head plate 46. The rod 38 pivotally supports a link 48 upon pivot pin 50, and a lower pivot pin is associated with the head through the head mounted bracket 52, FIG. 4. The length and relationships of the links 40 and 48 is such that these links form a "parallelogram" linkage support of the head with respect to the shaft 36 and the rod 38. Thus, when the shaft 36 is oscillated in opposite directions to raise and lower the links 40, the head 34 will maintain a horizontal orientation through all of its vertical positioning.

The head 34 includes a pair of spaced parallel plates 46 and 54 maintained in spaced relationship by suitable spacers and fastening means. A forwardly extending horizontally disposed support 56 extends from between the plates for supporting bracket 52.

Figure 7:
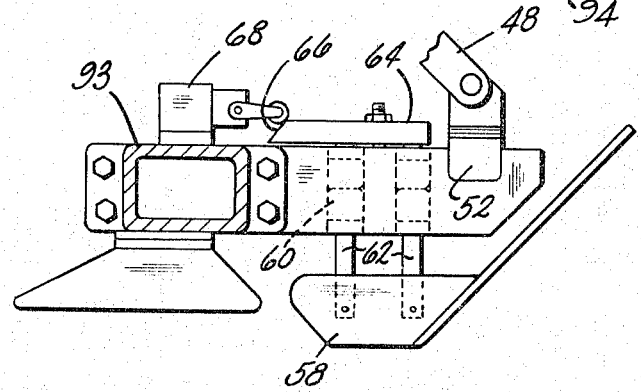
FIG. 7 is a sectional elevational detail view through the lower portion of the mounting head as taken along Section VII–VII of FIG. 5, illustrating the wheel rim sensing means in its lowermost position prior to engaging a wheel rim.
Figure 8:
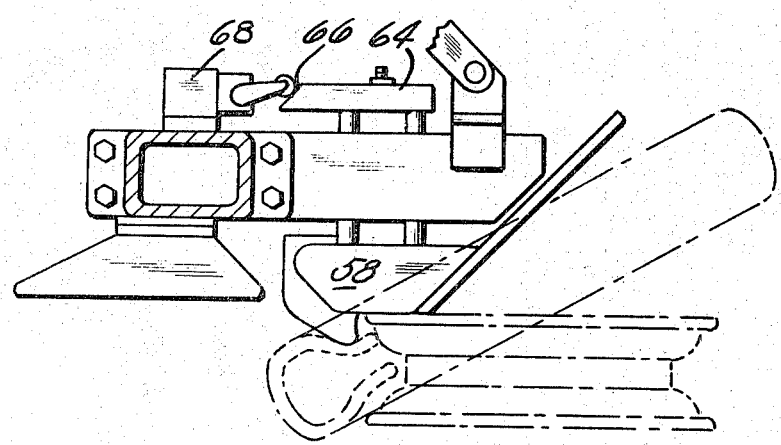
FIG. 8 is an elevational view similar to FIG. 7 illustrating the engagement of the wheel sensing means with the wheel rim upon the tire mounting head being lowered to the mounting position.

A trigger shoe 58, FIGS. 7 and 8, is mounted upon the support 56 by means of bearings 60, FIG. 7, for movement in a vertical direction. The shoe 58 is supported upon shafts 62 extending through bearings 60, and a cam plate 64 is affixed to the upper ends of the shafts. The cam plate includes an oblique cam surface 66 adapted to be engaged by an electric limit switch 68 mounted upon the head. FIG. 7 illustrates the relationship of the cam surface 66 adapted to be and the limit switch actuator when the head is in the inoperative, or "at rest" position. FIG. 8 illustrates the position of the cam plate and limit switch upon the head being located in the operative position, as will be later described.

Figure 9:
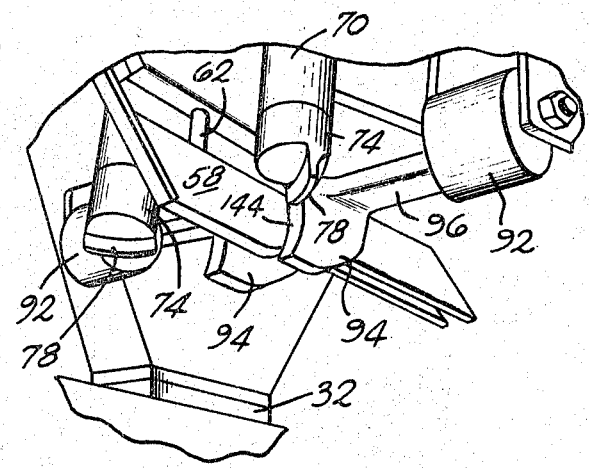
FIG. 9 is an underside perspective detail view illustrating the mounting shoes, rollers and holddown means.
Figure 14:
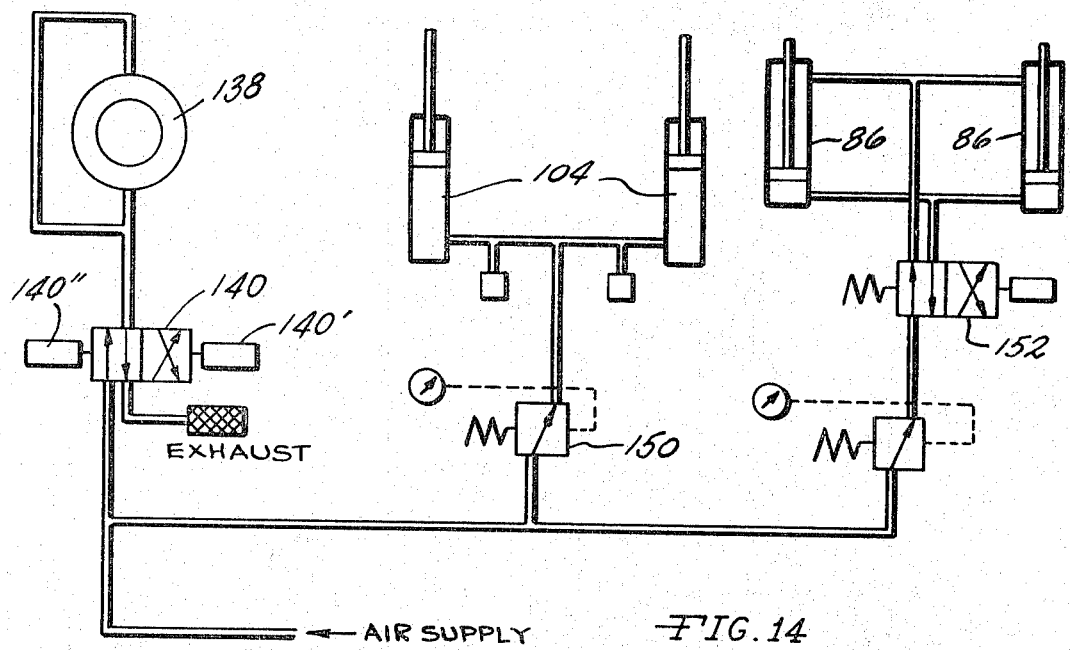
FIG. 14 is a diagram of the pneumatic circuit of the invention.

A pair of mounting shoe supporting arms 70 are mounted between the head plates 46 and 54 for pivotal motion about pins 72. The two mounting shoe arms, are identical in configuration and operation, and each includes an outer end in which a mounting shoe 74 is mounted for pivotal movement about a vertical axis on shaft 76. The mounting shoe 74 includes an arcuate configuration lip 78, FIG. 9, substantially corresponding to that of the wheel rim, and includes a thin portion and shoulder 80 over which the tire beads pass to be spread apart for disposing the beads over the shoe and over the wheel upper rim. A more detailed disclosure of the configuration and function of this type of shoe is shown in the assignee's U.S. Pat. No. 2,900,018.

The upper portion of each mounting shoe 74 includes an eccentric crankshaft 82 to which a tension spring 84 is affixed at one end, and anchored to the upper head plate 46 at the other end to impose a rotational biasing force upon the mounting shoes.

Figure 4:
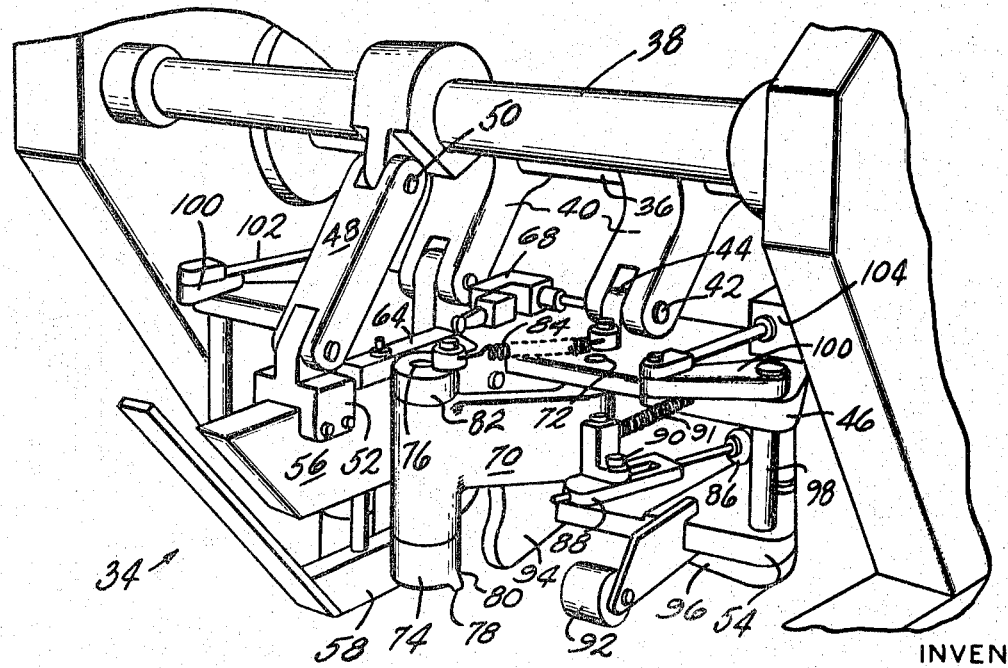
FIG. 4 is a front and right side perspective view of the mounting apparatus.

A pneumatic cylinder 86 is mounted intermediate the head plates at each lateral side of the head and the piston of each cylinder includes a slotted bracket 88, FIG. 4, in which a pin 90 is received. The pin 90 is affixed to a mounting shoe arm 70, and the pin and slotted bracket form a lost-motion connection between the biasing cylinder 86 and its associated mounting shoe arm 70. Also a compression spring 91 is affixed to each arm 70 tending to bias the mounting arm in a direction toward the support 56. The springs 91 are mounted upon rods 108 which attach to the arms 70 and slidably extend through holes in the box beam 93 mounted between plates 46 and 54.

A compression roller 92 is mounted upon each side of the mounting head 34 with respect to the center of the mounting head as represented by the support 56. The purpose of the rollers 92 is to engage and push down on the sidewall of the tire during mounting, and the operation of these rollers will be more fully described during the description of the operation of the apparatus.

Tire holddown means are also employed to engage the tie tire, and aid in the mounting of the tire upon the wheel. A pair of tire holddown members 94 are utilized with the head, and are each mounted upon an arm 96 located below the lower head plate 54, and are normally disposed toward the center of the head as to be disposed behind, and slightly laterally offset with respect to the trigger shoe 58.

The holddown arms 96 are each pivotally mounted to the head upon a vertically disposed shaft 98, to which a crank arm 100 is affixed which is pivotally connected to the piston 102 of a pneumatic biasing cylinder 104. It will be noted that the shaft 98 is disposed at a location substantially spaced from the support 56, and the position of this shaft permits the holddowns to have both a longitudinal directional movement with respect to the conveyor movement, and a transverse direction of movement with respect to the movement of the conveyor.

Figure 5:
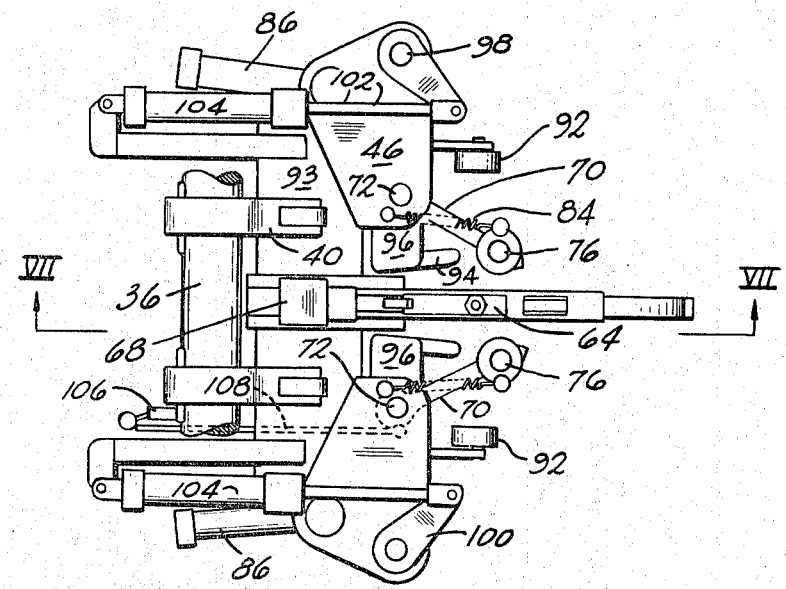
FIG. 5 is a plan detail view of the mounting apparatus, the link supporting shaft and links being only partially shown.
Figure 6:
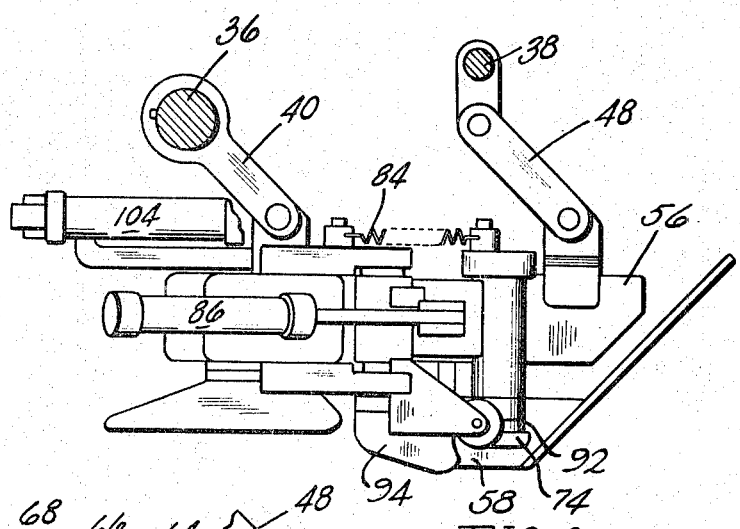
FIG. 6 is a detailed elevational view of the mounting apparatus as taken along Section VI—VI of FIG. 3.

A limit switch 106 is mounted upon the "rear" of the head, FIG. 5, and is adapted to be actuated by the spring rod 108 connected to the "lower" mounting shoe arm of this FIG.

Raising and lowering of the mounting head 34 is accomplished by rotation of the shaft 36. The shaft 36 includes a crank arm 110 affixed thereto, FIG. 1, and a pushrod 112 is mounted upon the apparatus framework such that the upper end of the pushrod is pivotally affixed to the crank arm 110, and the lower end of the pushrod is pivotally connected to frame 20 of the conveyor by means of link 114, and a cam follower roller 116 is located at the lower end of the push rod. The roller 116 may consist of a wheel adapted to be engaged by the periphery of the cam 26. The pushrod 112 includes a first portion 118, and a second portion 120. The second portion 120, which is connected to the crank arm 110, is telescopingly received within the portion 118 whereby relative motion between the portions 118 and 120 is possible in an axial direction. An elastic compressible collar 122, such as of rubber, is interposed between the pori portions 118 and 120 wherein compression forces transmitted through the pushrod 112 pass through the compression member 122. A limit switch 124 is mounted upon the pushrod 112 and senses any relative movement between the pushrod portions 118 and 120.

In the rest position the cam 26 would be rotated such that the high point 126 would be engaging the cam roller 116. This position rotates the shaft 36 to its extreme counterclockwise position, and raises the head 34 to its highest position.

Wheels 128 are located upon the conveyor carriers 28, and each of the wheels includes spaced annular rims 130 between which the tires 132 are to be mounted. The tires are preliminarily placed upon the wheels 128 in a manner apparent in FIG. 1 wherein that portion of the tire disposed toward the mounting head is substantially in alignment with the portion of the wheel intermediate its rims 130, while the trailing end of the tire is disposed considerably above the upper rim of the wheel. This relationship of the tire and wheel can be either automatically or manually accomplished, and occurs when the tire is merely rested against the wheel in the disclosed relationship shown in FIG. 1.

Upon energization of the motor driving the conveyor shaft 18 the shaft begins to turn in a counterclockwise direction causing the cam follower 116 to ride off of the cam "high point" 126 and travel across the lowering surface 134. As the cam roller engages the surface 134 the shaft 36 will oscillate in a clockwise direction lowering the head 34 toward the approaching wheel and tire. The shape of the cam 26 is such that when the lead portion of the upper wheel rim 130 is disposed below the trigger shoe 58 the trigger shoe will engage the upper wheel rim and rest thereon, as the remainder of the mounting head apparatus continues in a downwardly direction. The length of the trigger shoe is sufficient for this purpose. Move Movement of the head downwardly now causes the limit switch 68 to ride over the cam surface 66, and upon a predetermined movement of the actuating roller of the limit switch, the limit switch 68 will close which will shift solenoid operated relay 140' and valve 140 to set the brake mechanism associated with the drum 136 mounted upon shaft 36.

The brake mechanism is preferably of a contractible type adapted to clamp the outer periphery of the shaft drum 136, and thereby lock the shaft against further rotation. In the described embodiment the brake 138 is of an annular pneumatic type such as a Fawick Airflex-type CB brake. Thus, closing of the limit switch 68 actuates the solenoid 140' of valve 140 to permit compressed air to flow into brake 138 and clamp the drum 136. Further rotation of the shaft 36 is thereby prevented and the mounting head 34 will be locked in its operative position.

The adjustment of the cam plate 64 is such that the brake will be energized to very accurately locate the mounting head 34 relative to the position of the upper wheel rim 130. In that each wheel is separately sensed, and the position of the wheel upper rim determined determines the operating position of the mounting head, various sizes of wheels can be intermixed upon the conveyor, and the mounting apparatus will automatically compensate for any differences in wheel widths.

When the head is in the a inactive position, and is preparing to receive a wheel and tire for mounting, the mounting shoe arms 70 and shoes 74 will be disposed adjacent the trigger shoe 58 as shown in FIG. 4. The holddown cylinders 104 will be charged with air, such as 10 pounds per square inch as determined by regulator 150, and to provide a biasing force on the holddown arms 96 which biases the holddown members 94 toward the mounting shoes 74, and toward the direction n from which the wheel and tire are being received. The initial relationship of the mounting shoes 74, rollers 92, and holddown elements 94 will be appreciated from FIG. 10. In that the head is now properly vertically oriented, the downwardly disposed arcuate lip 78 of the mounting shoe will extend over the upper wheel rim 130, and thus the mounting shoe will make direct engagement with the wheel rim.

As the wheel and tire continue to move under the mounting head 34 the engagement of the mounting shoe lips with the wheel rim will cause the mounting shoes to ride about the wheel rim, one mounting shoe traveling about the wheel rim in one peripheral direction, while the other mounting shoe travels about the rim in the other peripheral direction. During this relative movement between the wheel rim and the mounting shoes, the beads of the tire as represented at 142, will be passing over the mounting shoe shoulders 80.

Figure 10:
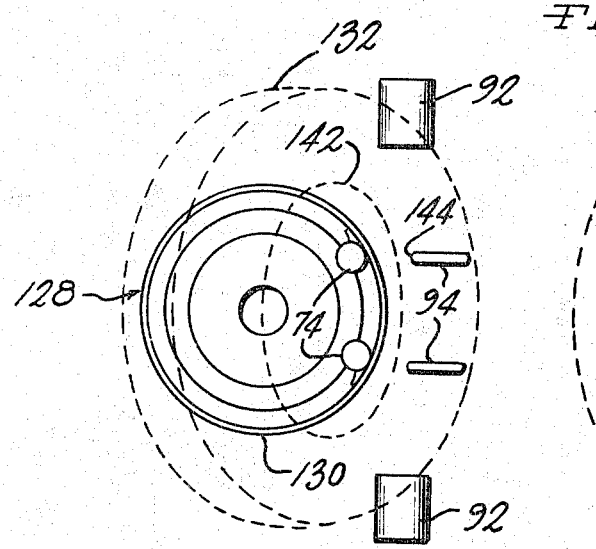
FIG. 10 through 12 are sequential schematic views illustrating the relationship of the tire engaging mounting components during mounting of a tire.
Figure 11:
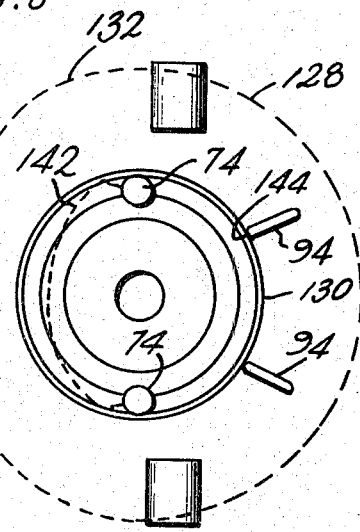
Figure 12:
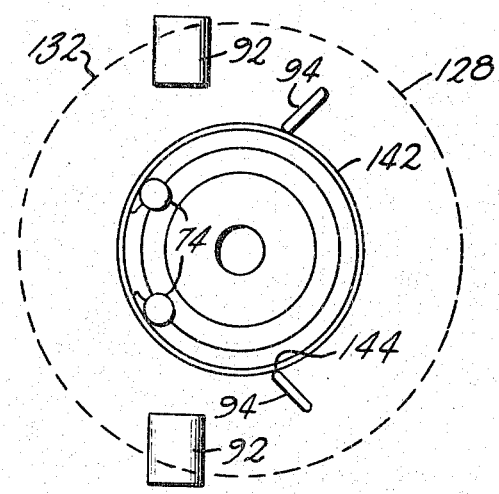
Figure 13:
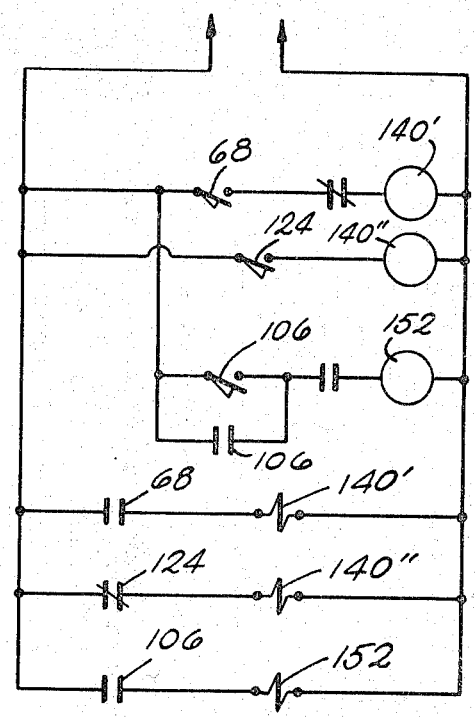
FIG. 13 is a diagram of the electrical circuit used with the tire mounting apparatus of the invention.

The forward edges 144 the holddown members 94 are adapted to engage the upper wheel rim as the wheel and tire move below the mounting head. Initially, as shown in FIG. 10, the holddown means will be disposed over the lowermost portion of the tire 132 as the mounting shoes engage the wheel rim. As the mounting shoes begin to move about the periphery of the wheel rim the holddown surface 144 will engage the wheel rim, and the holddown members 94 will begin to follow the wheel rim behind the mounting shoes, as represented in FIGS. 11 and 12. In that the holddown arms 96 are pivoted to the head adjacent the lateral portions of the head a the are arms begin pivoting in the direction of movement of the wheel, as well as permitting the holddown members to move away from each other as they follow the wheel rim periphery. Thus, both parallel and lateral movement of the holddown elements occurs relative to the movement of the conveyor. FIG. 12 represents the position of the holddown members 94 when the mounting shoes 74 have substantially completed mounting of the tire on the wheel.

The holddown members 94 will engage the upper sidewall of the tire, and as they "trail behind" the mounting shoes 74 the holddowns will prevent the tire from being biased upwardly, and possibly demounting itself over the wheel rim before the mounting is complete. This maintaining of the tire in its mounted condition as mounting occurs is particularly important with respect to polyester and fiberglass tires which are relatively stiff in nature, and tend to be resilient enough to force the bead upwardly over the wheel rim if not restrained by the holddown members.

Forcing of the tire over the wheel rim is aided by the rollers 92, which are located just behind the mounting shoes 74 on the lower plate 54, and engage the upper sidewall of the tire during mounting. The relationship of on the rollers 92 relative to both the mounting shoes 74 and the holddown members 94 will be appreciated from FIGS. 10 through 12. The compression and forces imposed upon the tire by the rollers 92 aids in maintaining the tire mounted during the mounting procedure, and also imposes a downward force on the tire which aids in forcing the bead over the wheel rim.

When the mounting shoes reach a position substantially equal to that shown in FIG. 11, wherein the mounting shoes have traveled approximately one-half way around the wheel rim. The limit switch 106 is actuated by rod 108 which energizes relay and valve 152 which causes cylinders 86 to be energized forcing the cylinder pistons outwardly to engage the pins 90 with the end of the slot in brackets 88 and imposing a firm biasing force on the mounting shoe arms 70 which maintain the mounting shoes in engagement with the rim even though the movement of the mounting shoes is now toward each other and the center line of conveyor. Previous to the energization of cylinder 86 the springs 91 biased the shoes into engagement with the wheel rim.

Upon the mounting shoes reaching a position substantially corresponding to that of FIG. 12, the beads of the tire will "pop" over the remaining portion of the wheel rim, and the mounting of the tire upon the wheel is completed. Due to the force imposed on the tire by the rollers 92, and the completion of the mounting, the tire will fall clear of the mounting shoes and mounting apparatus, FIG. 1, and them the movement of the mounted tire along the conveyor continues without engagement with the head.

Soon after the mounting of the tire is completed the lift surface 146 of the cam engages the roller 116 and tends to move the pushrod 112 to the right, FIG. 1. Of course, any movement of the pushrod 112 towards the right is resisted by the brake 138 which prevents rotation of the crank arm 110 and shaft 36. Due to the presence of the compressible collar 122, the initial forces imposed upon the pushrod 112 will compress the collar, and this compression is sensed by the limit switch 124 which actuates relay and solenoid 140" and valve 140 to release the brake. Thus, as the rotation of the cam continues the push rod 112 will pivot the crank arm 110 and shaft 36 in a counterclockwise direction to raise the head 34 and prepare the apparatus for the next cycle.

The limit switch 106 also includes an overtravel contact which is actuated by an abutment mounted upon rod 108. The limit switch 106 is thus again actuated when them the mounting shoes 74 have completed mounting of the tire, and the cylinders 86 are then actuated by the relay and valve 152 to retract, and permit the mounting shoes, and the mounting shoe arms to be returned to the a original position. It will be appreciated that the loss motion connection imposed between the cylinders 86 and the associated mounting shoe arm 70 permits the springs 91 to produce the desired biasing force on the arms 70 during them the mounting procedure as represented which occurs between FIGS. 10 and 11. Also, the following of the mounting shoe about the wheel rim is aided by the rotational biasing force imposed upon the mounting shoes by the springs 84.

The described tire mounting apparatus is therefore able therefore able to automatically mount a wide variety of tires upon various sized wheels, and as the cycling of the head is controlled by the movement of the conveyor, a very accurate orientation between the position of the wheel and tire, and them the mounting apparatus can be maintained.

It is understood that various modifications to the inventive concept may be apparent to those skilled in the art without departing from the spirit and scope thereof, and it is intended that the invention be defined only by the following claims

I claim:

1. A tire mounting apparatus comprising, in combination, a conveyor adapted to a carry wheels having spaced annular rims wherein a tire is partially between the rims of the wheel, a fixed frame adjacent said conveyor, a tire mounting head mounted on said frame disposed over said conveyor, wheel rim engaging means mounted on said head engaging said wheel rim as it moves past said head and engaging the tire bead to spread the bead over said engaged rim, a pair of tire sidewall holddown means mounted on said head remotely from said wheel rim engaging means engaging that portion of the tire that has been mounted upon the wheel and maintaining the mounted position of the tire between the rims of the wheel during mounting of the tire, said holddown means each including a tire engaging portion extending between the rims of the conveyor mounted wheel holding the tire bead and sidewall between the wheel rims, and means supporting said holddown means on said head permitting said holddown means to pass on opposite sides of the center of the wheel as the wheel and tire moves past said head.

2. In a tire mounting apparatus as in claim 1, said means supporting said holddown means permitting movement of each of said holddown means transverse to the direction of movement of the tire, and means moving said holddown means transversely of the direction of movement of said conveyor during movement of a wheel and tire past said head.

3. In a tire mounting apparatus as in claim 2 wherein said means moving said holddown means includes a wheel rim engaging surface directly defined on each of said holddown means engaging the wheel rim over which the tire bead is spread.

4. In a tire mounting apparatus as in claim 1, said means supporting said holddown means including a pair of holddown arms pivotally mounted on said head, the axis of each of said arms being offset with respect to the path of movement of the center of the wheel moving past said head and disposed behind said wheel rim engaging means with respect to the approach of the wheel and tire to said head, said tire engaging holddown means being mounted upon said arms for simultaneous movement in the direction of conveyor movement and transverse thereto.

5. In a tire mounting apparatus as in claim 4 wherein each of said holddown arms includes an outer end, a tire engaging holddown mounted on each of said arm outer ends, a wheel rim engaging surface defined on each of said holddowns, and means biasing said arms about said axes for maintaining said holddowns in engagement with a wheel rim as the wheel moves past said head.

6. In a tire mounting apparatus as in claim 5 wherein said biasing means comprises a pneumatic expansible motor operatively associated with each of said arms.

7. In a tire mounting apparatus as in claim 1 wherein said wheel rim engaging means comprises a pair of mounting shoes each rotatably mounted upon an arm pivotally mounted upon said head, and pneumatic biasing means biasing each of said arms in a direction for maintaining said shoes in engagement with a wheel rim.

8. In a tire mounting apparatus as in claim 7, lost-motion means interposed between said biasing means and it its associated arm.

9. A tire mounting apparatus comprising, in combination, a conveyor adapted to carry wheels having spaced annular rims wherein a tire is partially alined between the rims of the wheel, a fixed frame adjacent said conveyor, a tire mounting head mounted on said frame disposed over said conveyor, wheel rim engaging means mounted on said head engaging said wheel rim as it moves past said head and engaging the tire bead to spread the bead over said engaged rim, and tire sidewall compression means mounted on said head disposed on opposite sides of said wheel rim engaging means and on opposite sides of the center of the wheel as the wheel and tire moves past said head engaging the side wall sidewall of the tire being mounted forcing the tire in the direction of the associated wheel rim during mounting.

10. In a tire mounting apparatus as in claim 9 wherein said compression means comprise rollers having axes transversely disposed to the direction of conveyor movement.

11. In a tire mounting apparatus as in claim 9, tire holddown means mounted on said head engaging that portion of the tire that has been mounted upon the wheel and maintaining the mounted portion of the tire between the rims of the wheel during mounting of the tire.

12. A tire mounting apparatus comprising, in combination, a conveyor adapted to carry wheels having spaced annular rims wherein a tire is partially alined between the rims of the wheel, a fixed frame adjacent said conveyor, a tire mounting head, pivotally mounted links mounting said head upon said frame over said conveyor permitting selective movement of said head toward and away from said conveyor, tire mounting means mounted on said head mounting a tire upon its associated wheel as it moves under said head, a rotatable shaft mounted on said frame supporting at least one of said links, means for oscillating said shaft to raise and lower said head, and brake means connected to said shaft selectively preventing rotation thereof.

13. A tire mounting apparatus as in claim 12 wherein said means for oscillating said shaft includes a crank arm fixed to said shaft, power-driven rotatable cam having an axis of rotation fixed relative to said frame, a pushrod pivotally connected at one end to said crank arm and having a cam follower mounted adjacent its other end adapted to follow said cam whereby said cam oscillates said shaft through said pushrod, a drum mounted in said shaft, said brake means comprising a contractible clamp adapted to selectively clamp said drum.

14. A tire mounting apparatus as in claim 13 wherein said pushrod includes first and second members relatively movable in the longitudinal direction of said rod, a compressible element interposed between said first and second members whereby the length of said rod contracts upon said cam tending to longitudinally translate said rod while said brake means is energized an and switch means is sensing compression of said rod-actuating brake release means.

UNITED STATES PATENT OFFICE
CERTIFICATE OF CORRECTION

Patent No. 3,545,463  Dated December 8, 1970

Inventor(s) John L. Mueller

It is certified that error appears in the above-identified patent and that said Letters Patent are hereby corrected as shown below:

Column 7, line 4, after "partially" insert -- alined --

Column 8, line 2, delete "it";

line 15, delate "side wall";

line 42, before "power-driven" insert -- a --;

line 55, delete "an";

line 55, delete "is", second occurrence.

Signed and sealed this 13th day of April 1971.

(SEAL)
Attest:

EDWARD M. FLETCHER, JR.  WILLIAM E. SCHUYLER,
Attesting Officer  Commissioner of Pate